(12) United States Patent
Prüssmeier et al.

(10) Patent No.: US 12,040,634 B2
(45) Date of Patent: Jul. 16, 2024

(54) LINEAR TRANSPORT SYSTEM, METHOD FOR OPERATING A LINEAR TRANSPORT SYSTEM, AND CONTACTLESSLY TRANSMITTING POWER AND DATA SYSTEM

(71) Applicant: Beckhoff Automation GmbH, Verl (DE)

(72) Inventors: Uwe Prüssmeier, Lemgo (DE); Thomas Vorbohle, Rietberg (DE); Dirk Otterpohl, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 925 days.

(21) Appl. No.: 17/085,532

(22) Filed: Oct. 30, 2020

(65) Prior Publication Data
US 2021/0046826 A1 Feb. 18, 2021

Related U.S. Application Data

(63) Continuation of application No. PCT/EP2019/062659, filed on May 16, 2019.

(30) Foreign Application Priority Data

May 16, 2018 (DE) ..................... 10 2018 111 715.9

(51) Int. Cl.
*H02J 50/80* (2016.01)
*B60L 5/00* (2006.01)
(Continued)

(52) U.S. Cl.
CPC .............. *H02J 50/80* (2016.02); *B60L 5/005* (2013.01); *B60L 9/16* (2013.01); *B60L 13/03* (2013.01);
(Continued)

(58) Field of Classification Search
CPC .. B60L 9/16; B60L 13/03; B60L 53/12; B60L 53/305; H01F 38/14;
(Continued)

(56) References Cited

U.S. PATENT DOCUMENTS

| 4,836,344 A | 6/1989 | Bolger |
| 5,927,657 A | 7/1999 | Takasan et al. |

(Continued)

FOREIGN PATENT DOCUMENTS

| AT | 520088 A4 | 1/2019 |
| DE | 3150380 A1 | 7/1983 |

(Continued)

OTHER PUBLICATIONS

Office Action dated Jan. 28, 2021 in connection with German patent application No. 10 2020 110 795.1, 16 pages including English translation.

(Continued)

*Primary Examiner* — Zachary L Kuhfuss
(74) *Attorney, Agent, or Firm* — Dorsey & Whitney LLP

(57) ABSTRACT

A linear transport system includes a movable carriage, a guide rail for guiding the carriage, and a linear motor for driving the carriage along the guide rail. A system is provided for contactless power and data transmission; e.g., where power and data are each sent inductively via separate coils to the carriage of the linear transport system and/or received by the carriage of a linear transport system. A method of operating such a linear transport system and a contactless power and data transmission system are also included.

20 Claims, 15 Drawing Sheets

(51) Int. Cl.
 *B60L 9/16*   (2006.01)
 *B60L 13/03*   (2006.01)
 *B60L 53/12*   (2019.01)
 *B65G 35/06*   (2006.01)
 *B65G 54/02*   (2006.01)
 *H01F 38/14*   (2006.01)
 *H02J 50/10*   (2016.01)
 *H02J 50/40*   (2016.01)
 *B60L 53/30*   (2019.01)

(52) U.S. Cl.
 CPC .............. *B60L 53/12* (2019.02); *B65G 35/06* (2013.01); *B65G 54/02* (2013.01); *H01F 38/14* (2013.01); *H02J 50/10* (2016.02); *H02J 50/40* (2016.02); *B60L 53/305* (2019.02); *H01F 2038/143* (2013.01)

(58) Field of Classification Search
 CPC ..... H01F 2038/143; H02J 50/10; H02J 50/40; H02J 50/80; B65G 54/02; B65G 35/06; H02K 41/031
 USPC .............. 307/104; 191/10; 246/194; 104/290
 See application file for complete search history.

(56) References Cited

U.S. PATENT DOCUMENTS

| | | | |
|---|---|---|---|
| 6,089,512 | A | 7/2000 | Ansorge et al. |
| 6,499,701 | B1 * | 12/2002 | Thornton ................ B60L 5/005 246/194 |
| 7,232,020 | B2 | 6/2007 | Futschek |
| 7,243,752 | B2 | 7/2007 | Green et al. |
| 8,347,789 | B2 | 1/2013 | Wolf et al. |
| 9,045,291 | B2 | 6/2015 | Konrad et al. |
| 9,079,724 | B2 | 7/2015 | Van De Loecht et al. |
| 9,188,421 | B2 * | 11/2015 | Prüssmeier .......... G01D 5/2046 |
| 9,555,720 | B2 | 1/2017 | Aumann et al. |
| 9,601,265 | B2 | 3/2017 | Sugino et al. |
| 9,806,647 | B2 | 10/2017 | Prüssmeier et al. |
| 10,173,865 | B2 | 1/2019 | Frantzheld et al. |
| 10,196,073 | B2 | 2/2019 | Pruessmeier |
| 10,926,406 | B2 | 2/2021 | Prüssmeier et al. |
| 11,161,700 | B2 | 11/2021 | Weber |
| 2009/0085706 | A1 | 4/2009 | Baarman et al. |
| 2011/0302078 | A1 * | 12/2011 | Failing .................. B60L 53/126 700/297 |
| 2012/0217816 | A1 | 8/2012 | Wang et al. |
| 2013/0030211 | A1 | 1/2013 | Echigo et al. |
| 2013/0084157 | A1 | 4/2013 | Staunton et al. |
| 2016/0090275 | A1 | 3/2016 | Piech et al. |
| 2019/0047799 | A1 | 2/2019 | Spotti |
| 2019/0097466 | A1 | 3/2019 | Floresta et al. |
| 2021/0046826 | A1 | 2/2021 | Prüssmeier et al. |
| 2023/0044922 | A1 | 2/2023 | Achterberg et al. |

FOREIGN PATENT DOCUMENTS

| | | |
|---|---|---|
| DE | 3504753 A1 | 8/1986 |
| DE | 10147859 A1 | 4/2003 |
| DE | 102004031580 B4 | 2/2007 |
| DE | 10216422 C5 | 2/2011 |
| DE | 102010001484 A1 | 9/2011 |
| DE | 102011004348 A1 | 8/2012 |
| DE | 102011014887 A1 | 9/2012 |
| DE | 102011103318 A1 | 12/2012 |
| DE | 102012201059 A1 | 7/2013 |
| DE | 102012103378 A1 | 10/2013 |
| DE | 102013110341 A1 | 3/2014 |
| DE | 102013108767 A1 | 2/2015 |
| DE | 102014100636 A1 | 7/2015 |
| DE | 102015102236 A1 | 8/2016 |
| DE | 102015116808 B3 | 1/2017 |
| DE | 202017105290 U1 | 10/2017 |
| DE | 102016222806 B3 | 4/2018 |
| DE | 102018111715 A1 | 11/2019 |
| EP | 1984203 B1 | 7/2014 |
| WO | 9631381 A1 | 10/1996 |

OTHER PUBLICATIONS

International Preliminary Report on Patentability dated Apr. 25, 2022 in connection with International patent application No. PCT/EP2021/060348, 25 pages including English translation.

International Search Report and Written Opinion dated Jul. 8, 2021 in connection with International patent application No. PCT/EP2021/060348, 17 pages including English translation.

"EtherCAT—the Ethernet Fieldbus," Beckhoff Automation GmbH, Nov. 2012, 21 pages.

Examination Report dated May 2, 2019 in connection with German patent application No. 102018111715.9, 25 pages including English machine translation.

International Search Report and Written Opinion dated May 16, 2019 in connection with International Application No. PCT/EP2019/062659, 32 pages including English machine translation.

* cited by examiner

LINEAR TRANSPORT SYSTEM, METHOD FOR OPERATING A LINEAR TRANSPORT SYSTEM, AND CONTACTLESSLY TRANSMITTING POWER AND DATA SYSTEM

CROSS-REFERENCE TO RELATED APPLICATIONS

This patent application is a continuation of International Patent Application PCT/EP2019/062659, filed May 16, 2019, entitled LINEAR TRANSPORT SYSTEM, METHOD FOR OPERATING A LINEAR TRANSPORT SYSTEM AND CONTACTLESSLY TRANSMITTING POWER AND DATA SYSTEM, and claims the priority of German patent application DE 10 2018 111 715.9, filed May 16, 2018 entitled LINEARES TRANSPORTSYSTEM UND SYSTEM ZUR KONTAKTLOSEN ENERGIE-UND DATENÜBERTRAGUNG, each of which is hereby incorporated by reference herein, in the entirety and for all purposes.

FIELD

The present invention relates to a linear transport system, to a method for operating a linear transport system and to a contactless power and data transmission system.

BACKGROUND

DE 10 216 422 C5 describes a device for inductive power supply and for guiding a freely movable object. The power transfer takes place via only one conductor loop.

DE 10 2004 031 580 B4 describes an arrangement for contactless inductive power transmission on movable devices. Power and data are transmitted via a shared coil.

EP 1 984 203 B1 describes a transport system comprising a rail system and a carriage arranged thereon. Each carriage comprises a secondary coil and is inductively coupled to the rail system for transmitting electrical power and/or information about it. In addition, leaky waveguides and antennas are used for redundant data transmission.

SUMMARY

The invention provides for efficiently transmitting power and data to a carriage of a linear transport system in a contactless manner.

According to a first aspect, a linear transport system is provided, which comprises: a movable carriage, a guide rail for guiding the carriage, a linear motor for driving the carriage along the guide rail, the linear motor comprising a stator and a rotor, the stator comprising at least one motor module arranged along the guide rail in a stationary manner, each comprising one or a plurality of drive coils, the rotor being arranged on the carriage and comprising one or a plurality of magnets, and a system for contactlessly transmitting power and data.

The system for contactlessly transmitting power and data comprises: one or a plurality of stationary coil modules which are arranged along the at least one motor module in a stationary manner, one or a plurality of carriage-coil modules arranged at the carriage, wherein said one or said plurality of stationary coil modules each comprises one or a plurality of power-transmitting coils and one or a plurality of first data coils, wherein said one or said plurality of carriage-coil modules comprise one or a plurality of power-receiving coils which may be inductively coupled to said one or said plurality of power-transmitting coils and one or a plurality of second data coils which may be inductively coupled to said one or said plurality of first data coils, a control device which is embodied to control a voltage supply for said one or for said plurality of stationary coil modules in order to apply an electrical voltage to at least one of said one or said plurality of power-transmitting coils and/or in order to apply an electrical voltage to at least one of said one or said plurality of first data coils, respectively, so that power may be contactlessly transmitted to the carriage via an inductive coupling of a power-transmitting coil, to which an electrical voltage has been applied, to a power-receiving coil and/or data may be transmitted contactlessly to the carriage and/or received from the carriage via an inductive coupling of a first data coil, to which an electrical voltage has been applied, to a second data coil.

According to a second aspect, a method for operating the linear transport system is provided, comprising the following steps: controlling the power supply by means of the control device so that at least one of said one or said plurality of power-transmitting coils and/or at least one of said one or said plurality of first data coils is/are each supplied with an electrical voltage, so that power is contactlessly transmitted to the carriage via an inductive coupling of a power-transmitting coil, to which an electrical voltage has been applied, to a power-receiving coil, and/or data is contactlessly transmitted to the carriage and/or received from the carriage via an inductive coupling of a first data coil, to which an electrical voltage has been applied, to a second data coil.

According to a third aspect, a contactless transmitting power and data comprises: one or a plurality of stationary coil modules arranged along at least a motor module in a stationary manner, one or a plurality of carriage-coil modules arranged at a carriage, wherein said one or said plurality of stationary coil modules each comprises one or a plurality of power-transmitting coils and one or a plurality of first data coils, wherein said one or said plurality of carriage-coil modules comprises one or a plurality of power-receiving coils which may be inductively coupled to said one or said plurality of power-transmitting coils and one or a plurality of second data coils which may be inductively coupled to said one or said plurality of first data coils.

A control device is embodied to control a power supply for said one or said plurality of stationary coil modules to apply an electrical voltage to at least one of said one or said plurality of power-transmitting coils and/or to at least one of said one or said plurality of first data coils, respectively, so that power may be contactlessly transmitted to the carriage via an inductive coupling of a power-transmitting coil, to which an electrical voltage has been applied, to a power-receiving coil and/or data may be contactlessly transmitted to the carriage and/or received from the carriage via an inductive coupling of a first data coil, to which an electrical voltage has been applied, with a second data coil, a communication interface embodied to receive a reference time via a communication network, wherein the control device is adapted to control the power supply based on the reference time in order to contactlessly transmit a clock signal based on the reference time as data to the carriage.

Examples and Embodiments

A separate coil arrangements for contactlessly transmitting power and data to a carriage of a linear transport system is provided. On the one hand, power-transmitting coils and power-receiving coils are provided so that power may be transmitted to the carriage and/or received from the carriage via an appropriate inductive coupling between these coils. On the other hand, first data coils and second data coils are provided so that data may be contactlessly transmitted to the carriage via an inductive coupling.

Thus, it is possible to transmit power and data to the carriage via separate channels. Moreover a wear-free power and data transmission is possible. It is also possible to contactlessly transmit data and power to the carriage, both when the carriage is stationary and during a movement of the carriage guided by the guide rail.

This provides the possibility to carry out actions with a carriage that is, as such, passive. Possible applications are, for example, an electrically operated weighing device and/or an electrically operated gripper, which are respectively arranged on the carriage.

After all, a concept for an efficient contactless power and data transfer to a carriage of a linear transport system is provided.

The wording "at least one" in particular includes the wording "one or a plurality of."

According to an embodiment it is provided that the system for contactlessly transmitting power and data comprises a communication interface which is embodied to receive a reference time via a communication network, the control device being embodied to control the power supply based on the reference time in order to contactlessly transmit a clock signal based on the reference time to the carriage as data.

The time-synchronized actions may therefore be performed by the carriage. For example, it is possible to grip objects from a fast product flow with precise timing. Furthermore, the actions of the carriage may be synchronized and precisely planned and executed.

In an embodiment, the communication interface comprises an EtherCAT-communication interface.

According to another embodiment, the communication network comprises an EtherCAT-communication network.

In another embodiment it is provided that the carriage has a carriage-power supply coupled to said one or said plurality of power-receiving coils to be adapted to supply the carriage-power supply with the transmitted power, the carriage having a carriage-control device coupled to the carriage-power supply for electrical power supply by the carriage-power supply.

The carriage-control device may be efficiently supplied with electrical energy. Thus, an additional power storage for the carriage-control device may be omitted.

According to a further embodiment it is provided that the carriage-voltage supply is coupled with at least one of said one or said plurality of second data coils, wherein the carriage-control device is embodied to control the carriage voltage supply in order to apply an electrical voltage to at least one of said at least one second data coil coupled with the carriage voltage supply, so that data may be transmitted contactlessly from the carriage via an inductive coupling of a second data coil, to which an electrical voltage has been applied, with a first data coil.

The data may be efficiently transmitted in a contactless manner from the carriage to the stationary coil coils. This advantageously makes it possible to create a return channel from the carriage back to the stationary coil modules. The data may not only be transmitted contactlessly to the carriage, but may also be transmitted back from the carriage. Thus, a measured value of a sensor arranged on the carriage may e.g. be contactlessly transmitted from the carriage to the stationary coil module(s). A bi-directional communication may be provided.

According to another embodiment, the carriage comprises an electrical device which is coupled to the carriage-power supply in order to be supplied with electrical power, wherein the carriage-control device is coupled to said one or said plurality of second data coils in order to receive the transmitted data from said one or said plurality of first data coils, and wherein the carriage-control device is embodied to control the electrical device based on the received data.

The electrical device may be efficiently supplied with electrical power. Thus, a separate energy storage for the electrical device may e.g. be omitted. Moreover, the electrical device may be operated or, respectively, controlled efficiently. Further, the electrical device may be remotely controlled via contactless data transmission. Such remote control is also possible with moving carriages.

In an embodiment, a plurality of electrical devices is provided. The plurality of electrical devices may be embodied identically or differently. Embodiments made in connection with one electrical device apply analogously to a plurality of electrical devices and vice versa.

An electrical device is for example one of the following electrical devices: gripper, actuator, sensor, weighing device.

Further, it is possible that on transmission of a corresponding clock signal based on the reference time, the electrical device may be controlled in such a way that the electrical device carries out one or a plurality of predetermined actions at a given or predetermined time. Such an action is, for example, the gripping of an object or a plurality of objects from a fast product flow of objects at a predetermined time.

In another embodiment it is provided that at least one of said one or said plurality of stationary coil modules extends along the at least one motor module, wherein the at least one stationary coil module has exactly one power-transmitting coil extending from a first end to a second end opposite of the at least one stationary coil module along the at least one motor module the first end.

The stationary coil module in question may have a simple design. Furthermore, it also e.g. provides the technical advantage that it is possible to contactlessly transmit power to the carriage over a length from the first to the second end, if the carriage extends over the respective coil module.

According to a further embodiment, it is provided that at least one of said one or said plurality of stationary coil modules extends along the at least one motor module, the at least one stationary coil module having a plurality of power-transmitting coils which are arranged at an offset with regard to each other along the at least one motor module.

An efficient energy transmission is possible. In particular, this results in the technical advantage that power ripples that may occur when the carriage moves along the relevant stationary coil module may be efficiently minimized. In particular, this enables a relatively even energy transfer without significant power fluctuations.

According to another embodiment, it is provided that the plurality of power-transmitting coils are arranged partially overlapping and at an offset with regard to each other.

An efficient consistent power transmission is possible without strong power fluctuations.

According to a further embodiment, it is provided that a plurality of stationary coil modules extending along the at least one motor module are provided, of which at least two are arranged directly adjacent to each other, wherein the two stationary coil modules directly adjacent to each other each comprise a part of a power-transmitting coil in such a way that the two parts form a power-transmitting coil.

The power fluctuations at a transition between the two adjacent stationary coil modules may be efficiently minimized when transferring power to a carriage moving over these two adjacent stationary coil modules.

These parts of a power-transmitting coil may also be referred to as power-transmitting coil parts.

According to another embodiment, it is provided that at least one of said one or said plurality of stationary coil modules is arranged on an outer side of the at least one motor module.

The system may be easily retrofitted for contactless data and energy transmission to an already installed linear transport system.

According to another embodiment, it is provided that at least one of said one or said plurality of stationary coil modules is arranged within an assembly space of the at least one motor module.

An already existing assembly space in the at least one motor module may be used efficiently.

In another embodiment, it is provided that at least one of said one or said plurality of stationary coil modules has a printed circuit board which comprises said one or said plurality of power-transmitting coils and said one or said plurality of first data coils, wherein the printed circuit board forms an outer side of the at least one motor module.

An efficient and space-saving arrangement of the corresponding stationary coil module on the motor module is possible.

Technical functionalities of the method according to the second aspect analogously result from corresponding technical functionalities of the linear transport system according to the first aspect and/or the contactless transmitting power and data system according to the third aspect.

This means in particular that method features result from corresponding system features and vice versa.

The linear transport system in the wording "system for contactlessly transmitting power and data for a linear transport system" is, according to one embodiment, the linear transport system according to the first aspect.

A coil in the sense of the description comprises two or more than two turns or windings. Thus, a coil in the sense of the description is different from a loop.

According to an embodiment, it is provided that the coils, e.g. the coils of the stationary coil module and/or the carriage-coil module, are arranged in layers or on a plurality of levels.

According to an embodiment, it is provided that one or a plurality of coils, e.g. coils of the stationary coil module and/or the carriage-coil module, are surrounded by a circuit board. For example, one or a plurality of coils are printed on a printed circuit board. For example, one coil is arranged inside of the board. For example, one or a plurality of coils are arranged in layers or on a plurality of levels within a printed circuit board.

In an embodiment, the linear transport system and/or the system for contactlessly transmitting data and power includes the power supply.

In an embodiment, a plurality of carriages are provided. Embodiments for one carriage analogously apply to a plurality of carriages, and vice versa.

BRIEF DESCRIPTION OF THE DRAWINGS

The invention will be discussed in more detail below on the basis of figures. Here, in a schematic illustration in each case.

DETAILED DESCRIPTION

Figure 1:
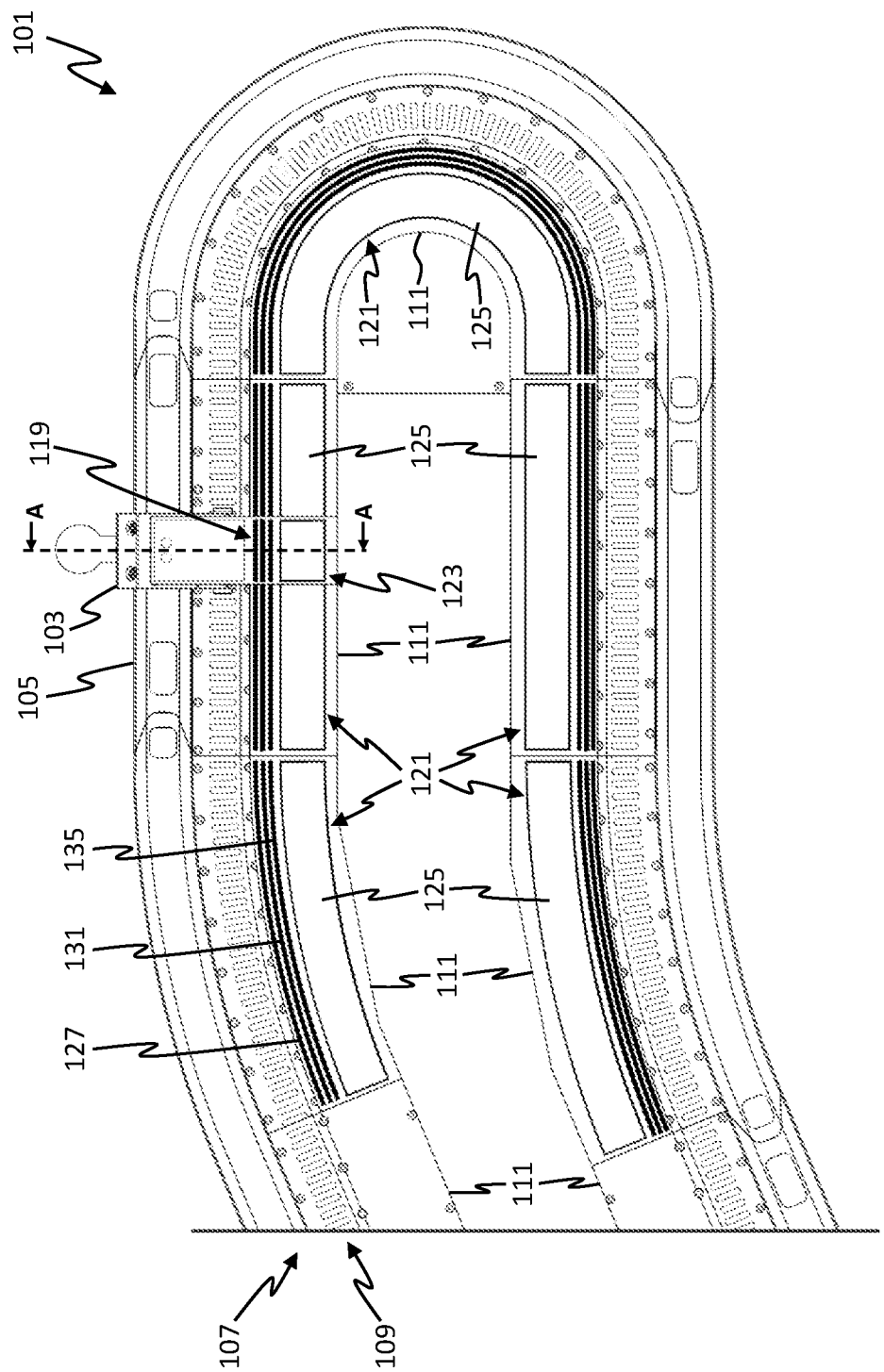
FIG. 1 shows a linear transport system and a system for contactlessly transmitting power and data in a side view.

In the following, the same reference numerals may be used for same features. For reasons of clarity, it may also be the case that not all elements are shown in every figure. Furthermore, for the sake of clarity, it may occur that not every element in every drawing has its own reference numeral.

FIG. 1 shows a linear transport system 101. The linear transport system 101 comprises a carriage which is guided by a guide rail 105.

The carriage 103 comprises rollers. The rollers of the carriage roll on running surfaces of the guide rail 105.

The linear transport system 101 further comprises a linear motor 107. The linear motor 107 comprises a stator 109. The stator 109 comprises a plurality of motor modules 111, each with a plurality of drive coils.

Furthermore, the linear motor 107 comprises a rotor, which is arranged at the carriage 103. The rotor comprises a plurality of magnets. Furthermore, the linear transport system 101 comprises a system for contactless data and power transmission 119. The system 119 comprises a plurality of stationary coil modules 121 which are arranged along the motor modules 111.

The system 119 further comprises a carriage-coil module 123 which is arranged on carriage 103. The stationary coil modules 121 each comprise a power-transmitting coil. Furthermore, the stationary coil modules 121 comprise a plurality of first data coils 127, 131, 135.

The carriage-coil module 123 comprises a power-receiving coil. Further, the carriage-coil module 123 includes a plurality of second data coils. The linear transport system 101 further comprises a power supply.

The system 119 further comprises a control device for contactless data and power transmission. The power-receiving coil and the second data coils are arranged on the carriage-coil module 123 in such a way that the power-receiving coil is opposite to the power-transmitting coil and the second data coils are opposite to the first data coils.

Thus, due to this opposite arrangement, the individual coils may be efficiently coupled with each other in an inductive manner. This means that the power-transmitting coil may be inductively coupled with the power-receiving coil.

Furthermore, the first data coils may be efficiently coupled with corresponding second data coils in an inductive manner. The respective inductive coupling may thus form a communication channel through which data may be transmitted in an advantageous manner. Such data include, for example, control commands and/or clock signals and/or sensor data of a sensor arranged at the carriage.

The control device is embodied to control the voltage supply in order to apply an electrical voltage to at least one of the energy coils and/or to at least one of the first data coils so that power may be transmitted contactlessly to the carriage 103 via an inductive coupling of a power-transmitting coil to which an electrical voltage has been applied with the power-receiving coil and/or data may be transmitted contactlessly to the carriage 103 and/or data may be received from the carriage 103 via an inductive coupling via an inductive coupling of a first data coil to which an electrical voltage has been applied with the corresponding second data coil.

The arrangement of the stationary coil modules 121 and the carriage-coil module 123 according to the invention may thus have the advantageous effect that power and/or data may be transmitted contactlessly to the carriage 103 or, respectively, data may be received from the carriage 103 both during a movement of the carriage 103 along the motor modules 111 and when the carriage 103 is stationary.

Figure 4:
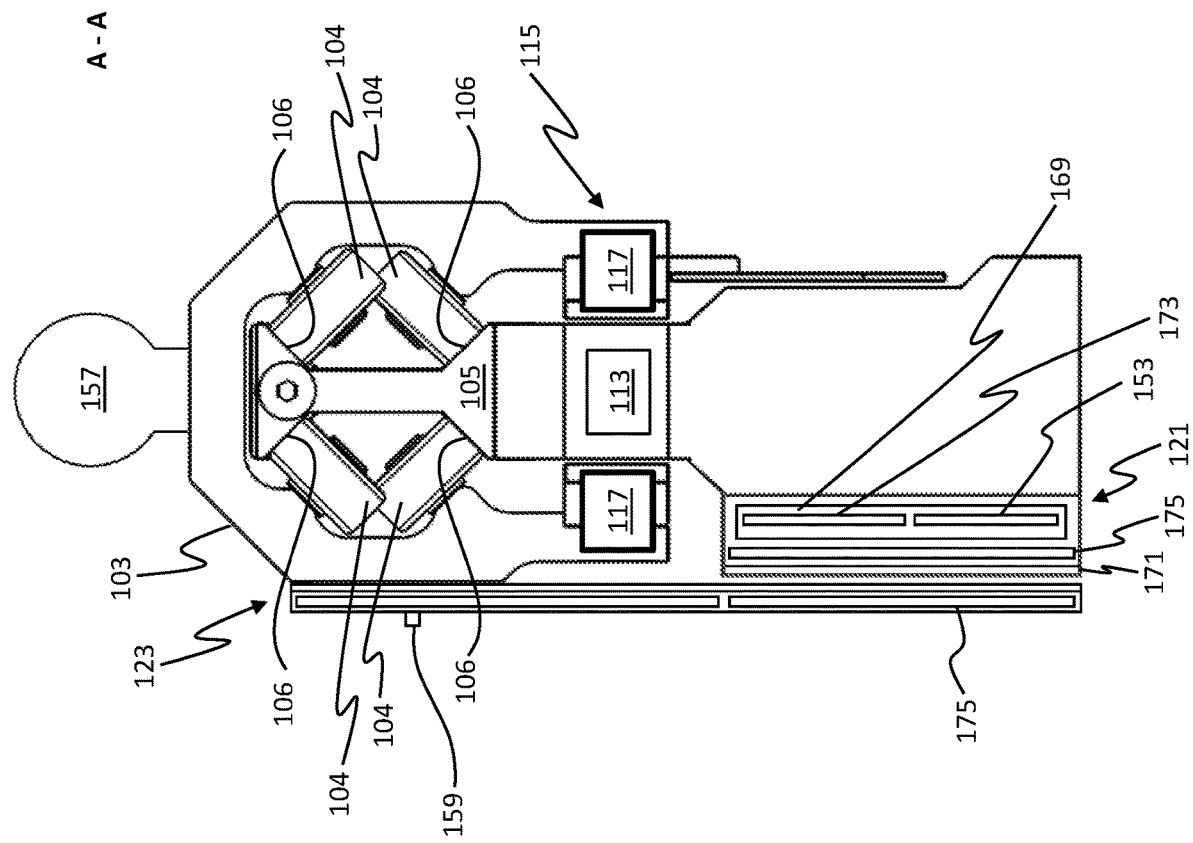
FIG. 4 is a sectional view of the linear transport and system for contactlessly transmitting power shown in FIG. 1 along a sectional line A-A shown in FIG. 1.

Furthermore, FIG. 1 shows a cutting line A-A wherein FIG. 4 shows a sectional view corresponding to the cutting line A-A.

Figure 2:
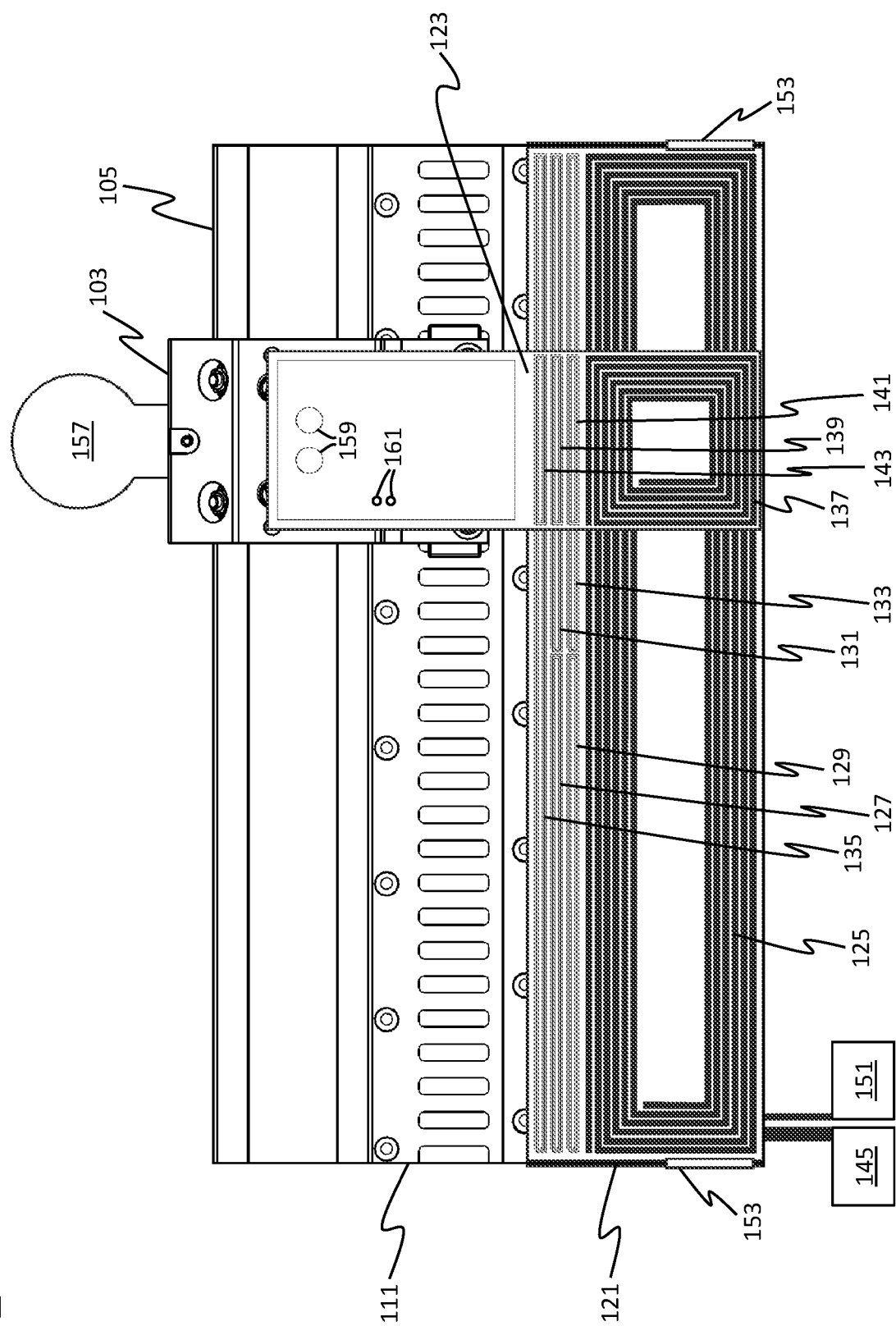
FIG. 2 depicts an enlarged detailed view of the linear transport system and system for contactlessly transmitting power and data shown in FIG. 1 in a side view.

FIG. 2 shows an enlarged detailed view of the carriage 103 on the guide rail 105 shown in FIG. 1. FIG. 2 furthermore shows a power-transmitting coil 125 of a stationary coil module 121 described in connection with FIG. 1. FIG. 2 also shows first data coils 127, 129, 131, 133, 135 as described in conjunction with FIG. 1.

FIG. 2 shows the above described power-receiving coil 137 of the carriage-coil module 123. FIG. 2 further shows the plurality of second data coils 139, 141, 143, as described above in connection with FIG. 1. FIG. 2 further shows the power supply 145 described above and the control device 151 described above.

The first data coils 127 and 131 may e.g. be inductively coupled to the second data coil 139 so that a first communication channel may be formed. For example, the first data coils 129 and 133 may be inductively coupled to the second data coil 141, so that a second communication channel may be formed. For example, the first data coil 135 may couple inductively with the second data coil 143, so that a third communication channel may be formed.

Via the third communication channel, e.g. a reference time may be sent to the carriage 103. Via the first and/or the second communication channel, data as described above may e.g. be sent to the carriage 103 and/or received from the carriage 103. Full-duplex communication is thus possible via the first and second communication channels.

The carriage 103 comprises an electrical device 157. For example, the electrical device 157 is a gripper.

Due to the fact that power may be contactlessly transferred to the carriage 103, the electrical device 157 may be operated. Two electrical connection points 159 are provided on the carriage coil module 123 to which the gripper 157 is electrically connected. Furthermore, the carriage-coil module 123 includes two optional status LEDs 161, which may e.g. signal a status of the carriage coil module 123.

The carriage-coil module 123 comprises a first installation space for electronics. In the first installation space for electronics, a carriage control device and a carriage-voltage supply are arranged.

The carriage-power supply is coupled to the power-receiving coil 137 in order to supply the carriage-power supply with the transmitted energy. The carriage-control device is coupled to the carriage-power supply for a supply of electrical energy by the carriage-power supply.

The stationary coil module 121 shown in FIG. 2 includes two opposite first electrical connections 153, through which the coil module 121 may be electrically connected to another coil module. Via these electrical connections, the applied voltages may e.g. be looped through.

Figure 3:
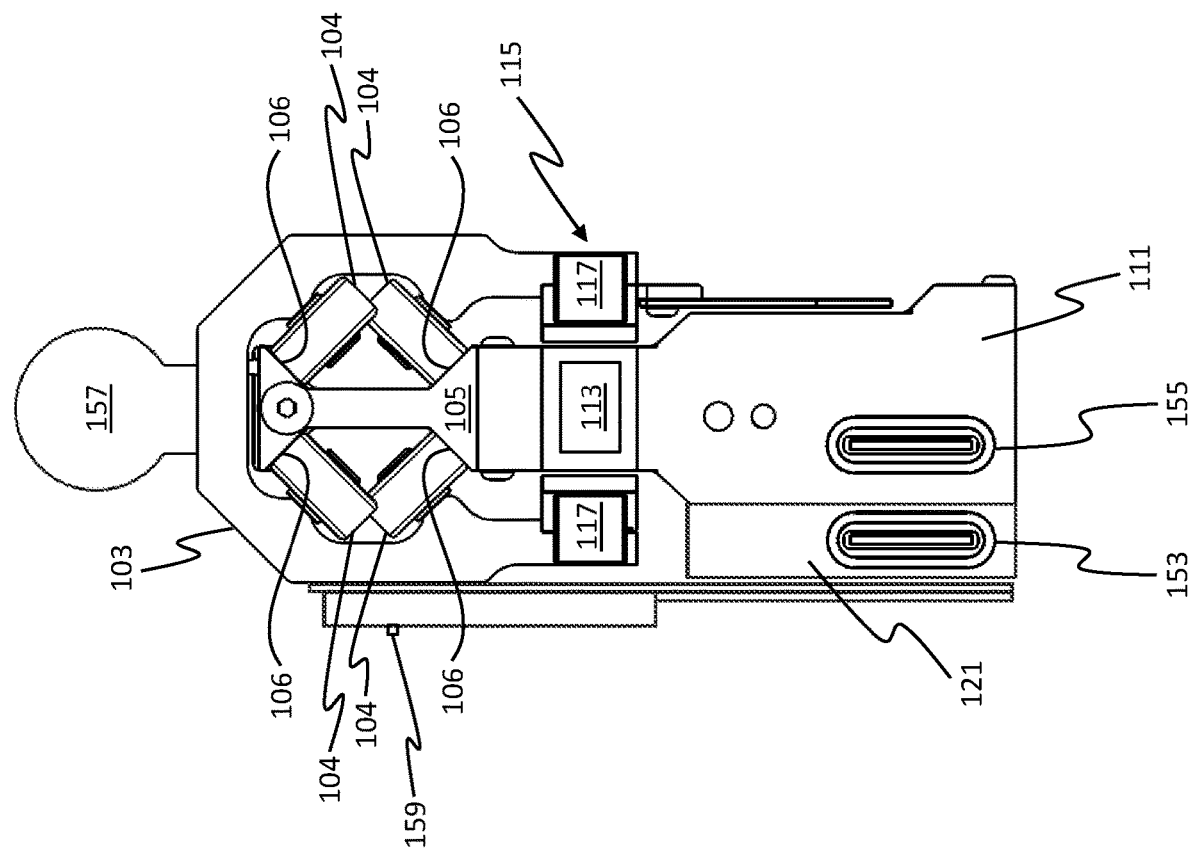
FIG. 3 depicts the linear transport system and system for contactlessly transmitting power and data shown in FIG. 2 in a front view.

FIG. 3 shows a front view of the linear transport system 121 shown in FIG. 2. The motor module 111 shows a second electrical connection 155 corresponding to the front view, which connects the motor module 111 with an adjacent motor module in an electrically conductive manner, e.g. to loop through a drive voltage for the drive coils.

FIG. 3 shows the rollers 104 of the carriage 103 and the running surfaces 106 of the guide rail 103 on which the rollers 104 roll. Furthermore, FIG. 3 symbolically shows drawn magnets 117 of the carriage 115 in an abstract manner. FIG. 3 further symbolically shows a drive coil 113 in an abstract manner.

FIG. 4 shows a sectional view of the linear transport system and system for contactlessly transmitting power along the sectional line A-A shown in FIG. 1. The stationary coil module 121 comprises an installation space 169 for electronics.

The second installation space for electronics 169 comprises a first board 171 and a second board 173. The first board 171 comprises the power-transmitting coil 125 and the first data coils 127, 129, 131, 133, 135. The second board 173 e.g. comprises the control device 151.

The first board 171 and the second board 173 are magnetically decoupled from each other by a ferrite material 175 according to an embodiment. This means that the ferrite material 175 provides a magnetic shielding. In particular, this means that the ferrite material 175 magnetically shields the second circuit board 173 from the magnetic fields of the coils of the first circuit board 171.

The ferrite material 175 further has the effect that a magnetic field may respectively be bundled at the individual coils. In general, a magnetically conductive material may be used instead of ferrite as shown in the illustration.

The front view according to FIG. 3 shows a first possibility of an arrangement of the coil module 121: the coil module 121 is arranged outside on the stationary motor module 111 according to the illustration in FIG. 3.

Figure 5:
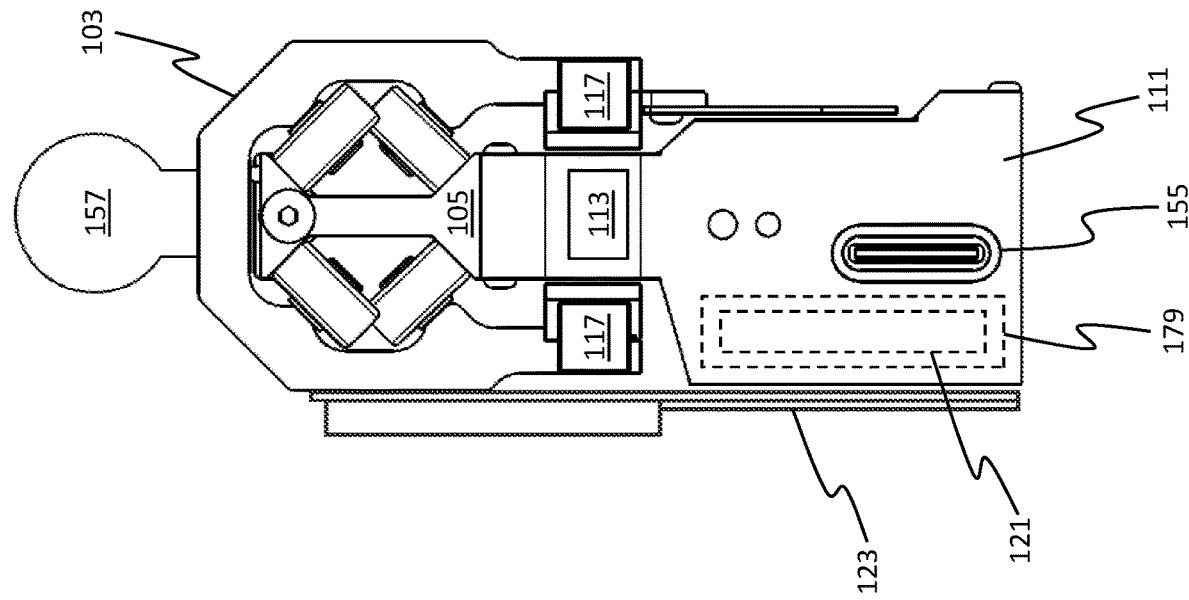
FIG. 5 shows an alternative embodiment of the system shown in FIG. 3 in a front view.

Compared to this first possibility, FIG. 5 shows a second possibility for an arrangement of the coil module 121. FIG. 5 shows a corresponding front view analogous to FIG. 3, wherein, in contrast to FIG. 3, the motor module 111 has an assembly space 179, within which the stationary coil module 121 is arranged, wherein the latter is only depicted abstractly by a rectangle.

Figure 6:
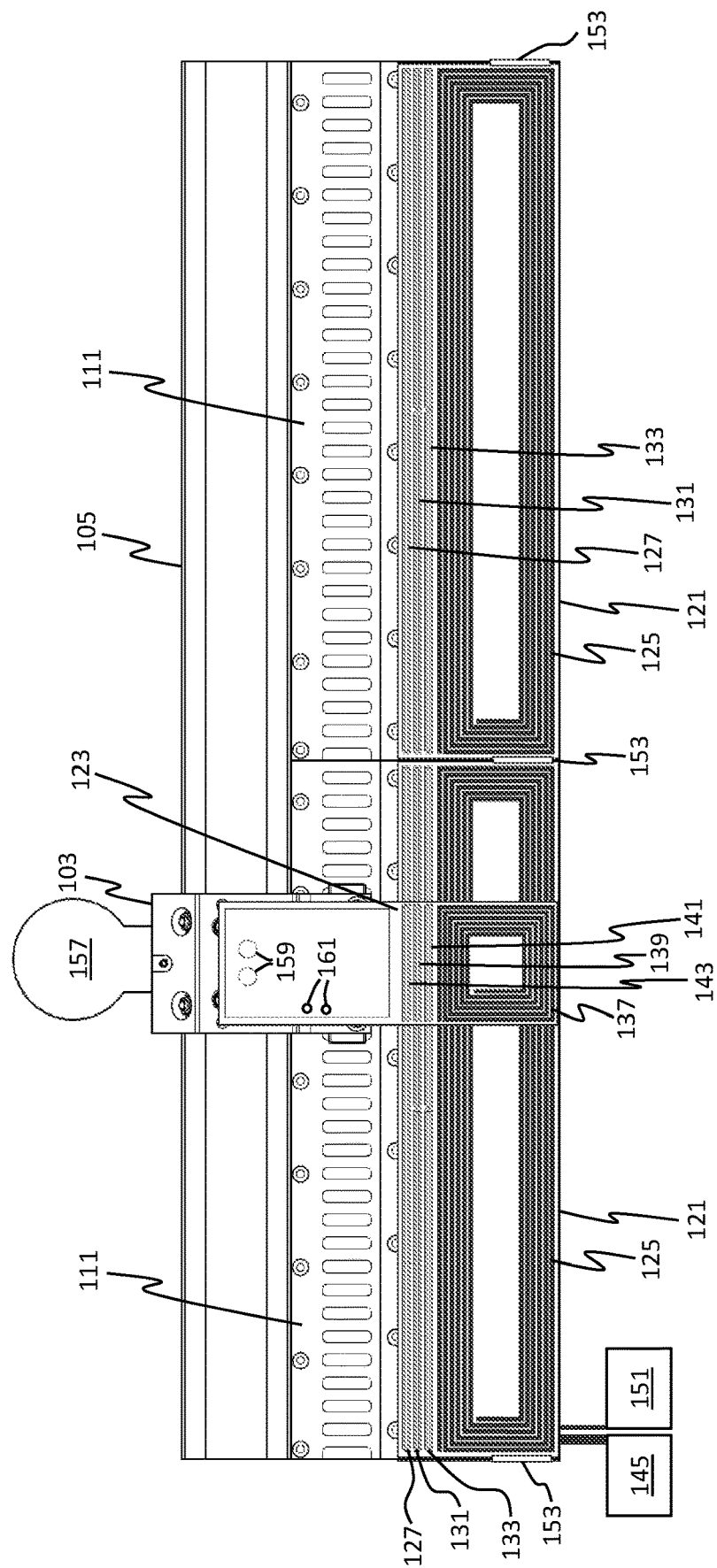
FIG. 6 shows the stationary coil module shown in FIG. 2 with an immediately adjacent stationary coil module in a side view.

FIG. 6 shows the coil module 121 shown in FIG. 2 with an immediately adjacent further coil module 121.

Figure 7:
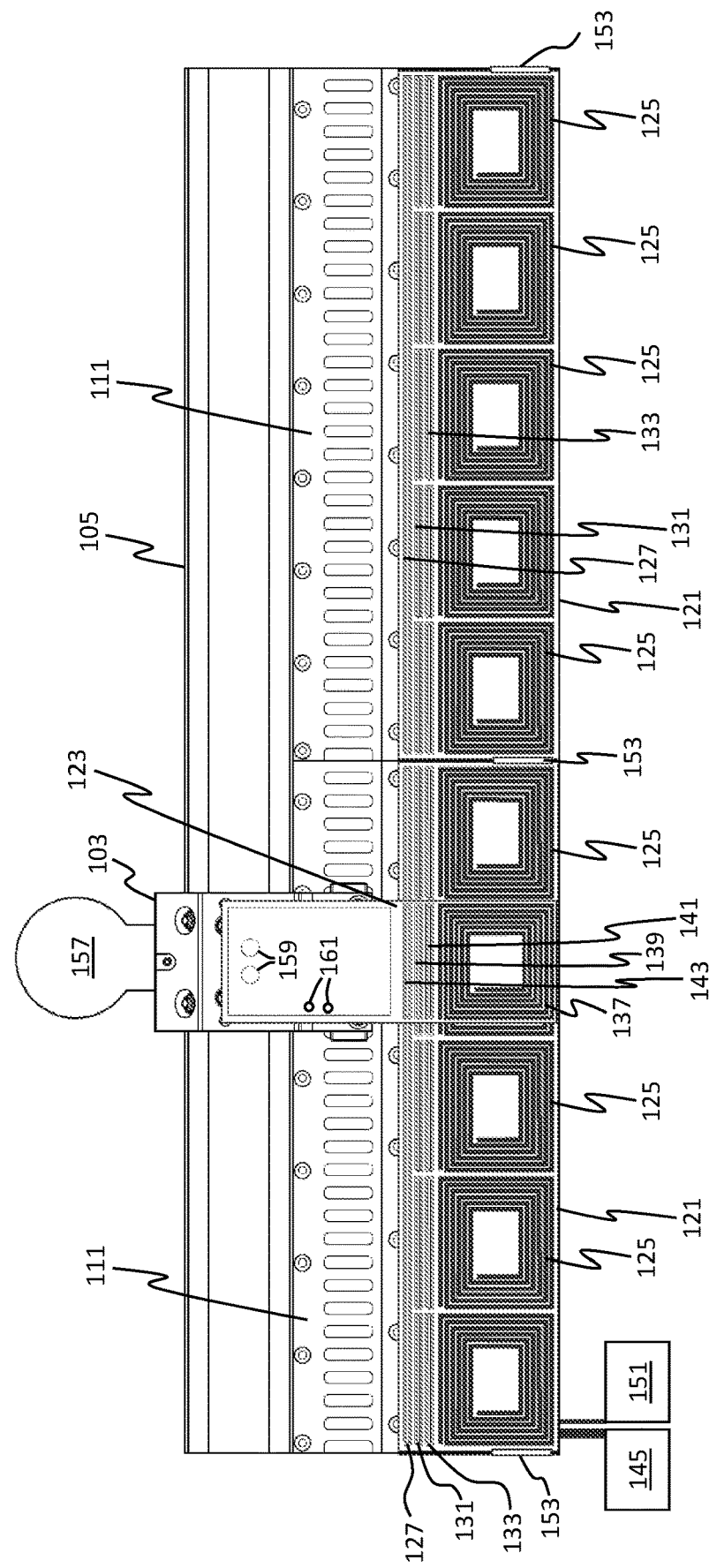
FIG. 7 depicts two stationary coil modules arranged immediately adjacent to each other in another embodiment in a side view.

FIG. 7 shows two immediately adjacent coil modules 121 in another embodiment. The embodiment shown in FIG. 7 corresponds in part to the embodiment shown in FIG. 6, so that reference is made to the above explanations.

In contrast to the embodiment of the coil modules 121 shown in FIG. 7, the coil modules 121 in the embodiment shown in FIG. 6 each comprise a plurality of power-transmitting coils 125. In the embodiment shown in FIG. 7, the power-transmitting coils 125 are arranged next to each other in one plane.

Figure 8:
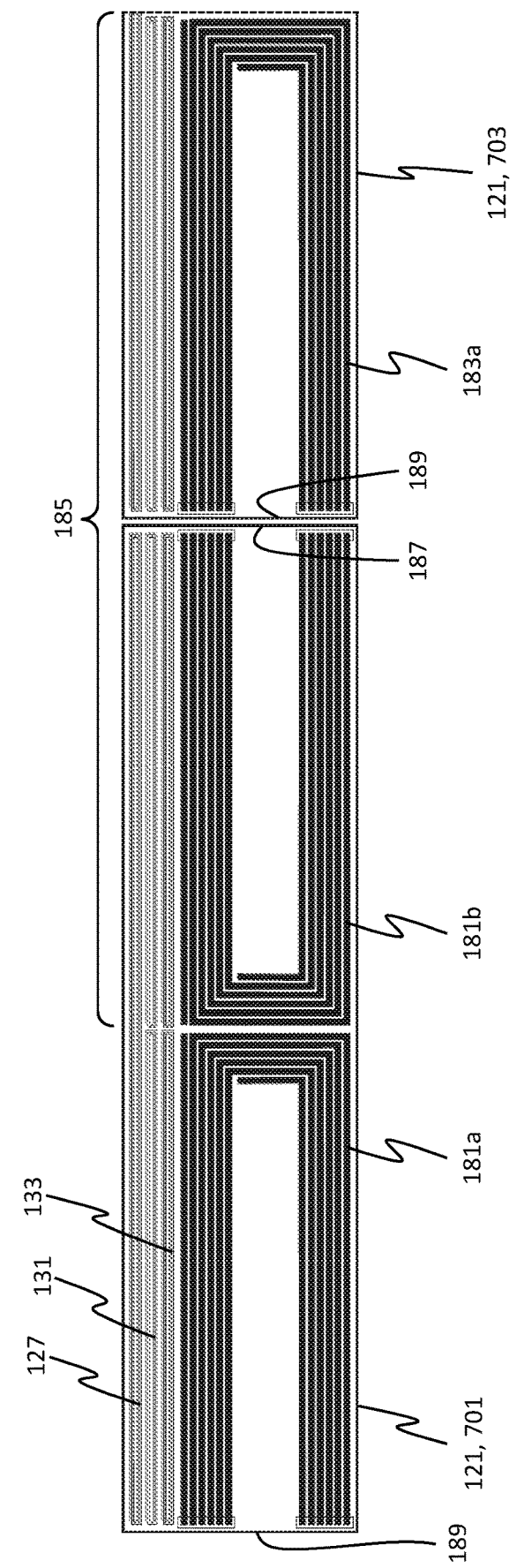
FIG. 8 is a sectional view of two coil modules in one embodiment in a side view.

FIG. 8 shows sections of two stationary coil modules 121 arranged directly adjacent to each other. The left-hand coil module 121 shown in FIG. 8 is additionally provided with the reference sign 701 for better differentiation. The right-hand coil module 121 shown in sections in FIG. 8 is additionally provided with reference sign 703 for better differentiation. The right and left coil module 701,703 are embodied identically, which is why the following explanations for the left coil module 701 apply analogously to the right coil module, and vice versa.

The left stationary coil module 701 comprises two first parts 181a and 181b of a power-transmitting coil. Both parts 181a and 181b are open towards the outside. The outside generally indicates a direction away from the corresponding coil module. Thus, the first left part 181a is open to the left. Thus, the right first part 181b is open to the right.

Analogously, the right stationary coil module 703 comprises two second parts of a power-transmitting coil, wherein for the sake of clarity, only one of the two second parts (the left one) is shown, which is indicated with the reference sign 183a. The two second parts, too, are embodied to open towards the outside.

The left coil module 701 has a right outer end 187 and a left outer end 189. Similarly, the right 703 coil module has a right outer end and a left outer end 189. The right end 187 of the left coil module 701 is opposite the left end 189 of the right coil module 703.

The right first part 181b and the left second part 183a in combination form a power-transmitting coil 185. For this purpose, the two parts 181b and 183a are electrically conductively connected to each other.

Similarly, the left first part 181b and a right second part of a coil module 701, which is arranged left of the left coil module 701, form a power-transmitting coil. Similarly, the right second part of the right coil module 703 and a left first part of a coil module arranged to the right of the right coil module 703 form a power-transmitting coil.

In this embodiment, a power-transmitting coil is distributed over two coil modules. For example, the parts of a power-transmitting coil each form one half of the power-transmitting coil.

An advantage of this embodiment is, for example, that in the transition between the coil modules, the transmitted power does not drop as much as in the case of two abutting power-transmitting coils of two immediately adjacent coil modules in which the power-transmitting coils are not distributed over two coil modules.

In an embodiment, it is provided that a power-transmitting coil has a parallelogram shape. This shape has the advantage that a transition between two corresponding power-transmitting coils is not bundled in one location. In this way, a drop in power may also be somewhat cushioned. A parallelogram shape may be different from a rectangular or a square shape according to an embodiment.

Figure 9:
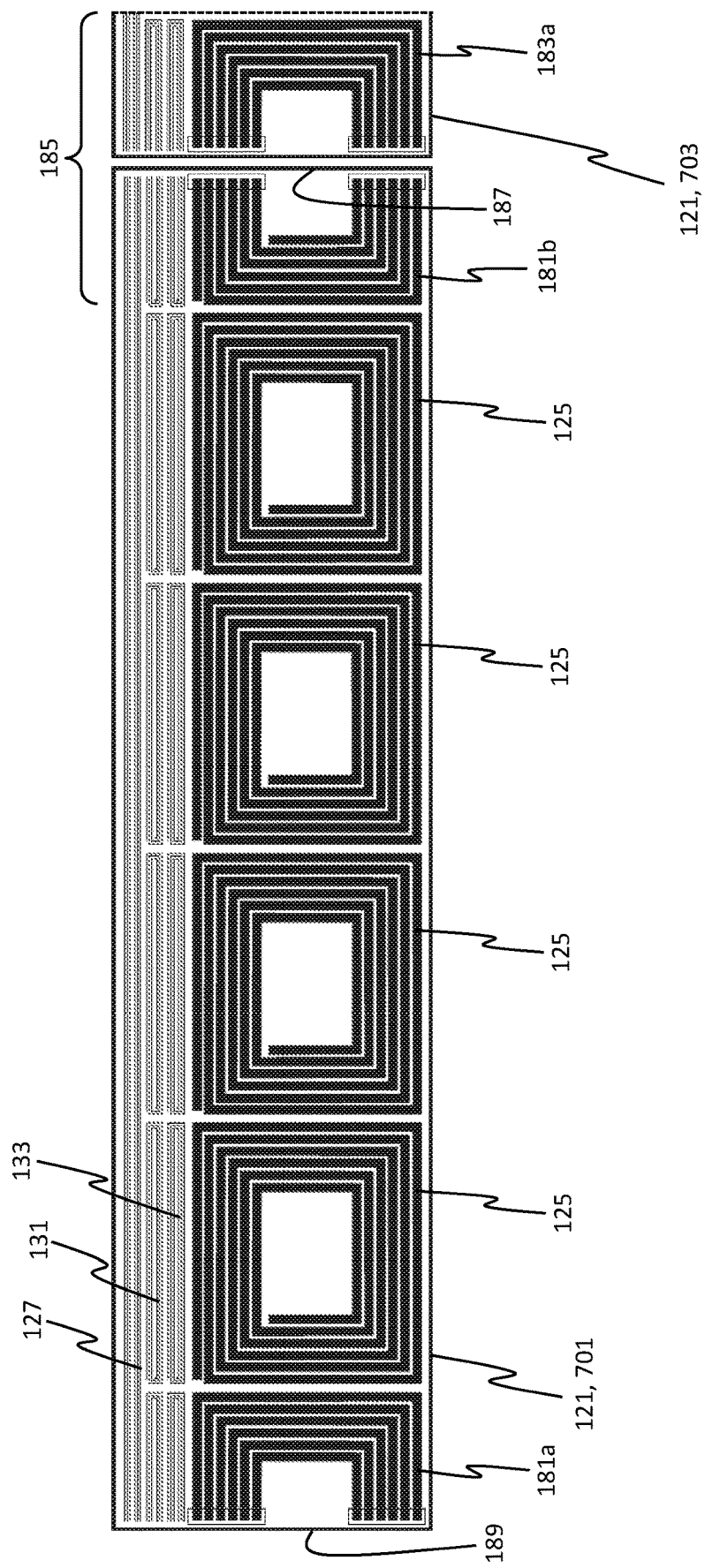
FIG. 9 is a sectional view of two coil modules in a further embodiment in a side view.

FIG. 9 shows sections of two stationary coil modules 121 in another embodiment. The stationary coil modules 121 shown in FIG. 9 are partly identical to the two coil modules 121 shown in FIG. 8. Reference is made to the above explanations.

In contrast, the two coil modules 121 of FIG. 9 have a plurality of power-transmitting coils 125 between the two first parts 181a and 181b of the left coil module 701 and between the two second parts 183a of the right coil module 703.

An advantage of this embodiment is that a maximum of one full-length carriage may overlap with a power-transmitting coil. The carriage detunes a natural frequency of an energy transmitting resonant circuit comprising the power-transmitting coil and the power-receiving coil. As in this embodiment, however, a plurality of power-transmitting coils per coil module are provided, the power-transmitting coils remain which are not or only weakly influenced by the carriage.

A width of a power-transmitting coil 125 of the coil modules 121 of FIG. 9 e.g. corresponds to a maximum length of a carriage so that a maximum length of a carriage may be above a power-transmitting coil.

Figure 10:
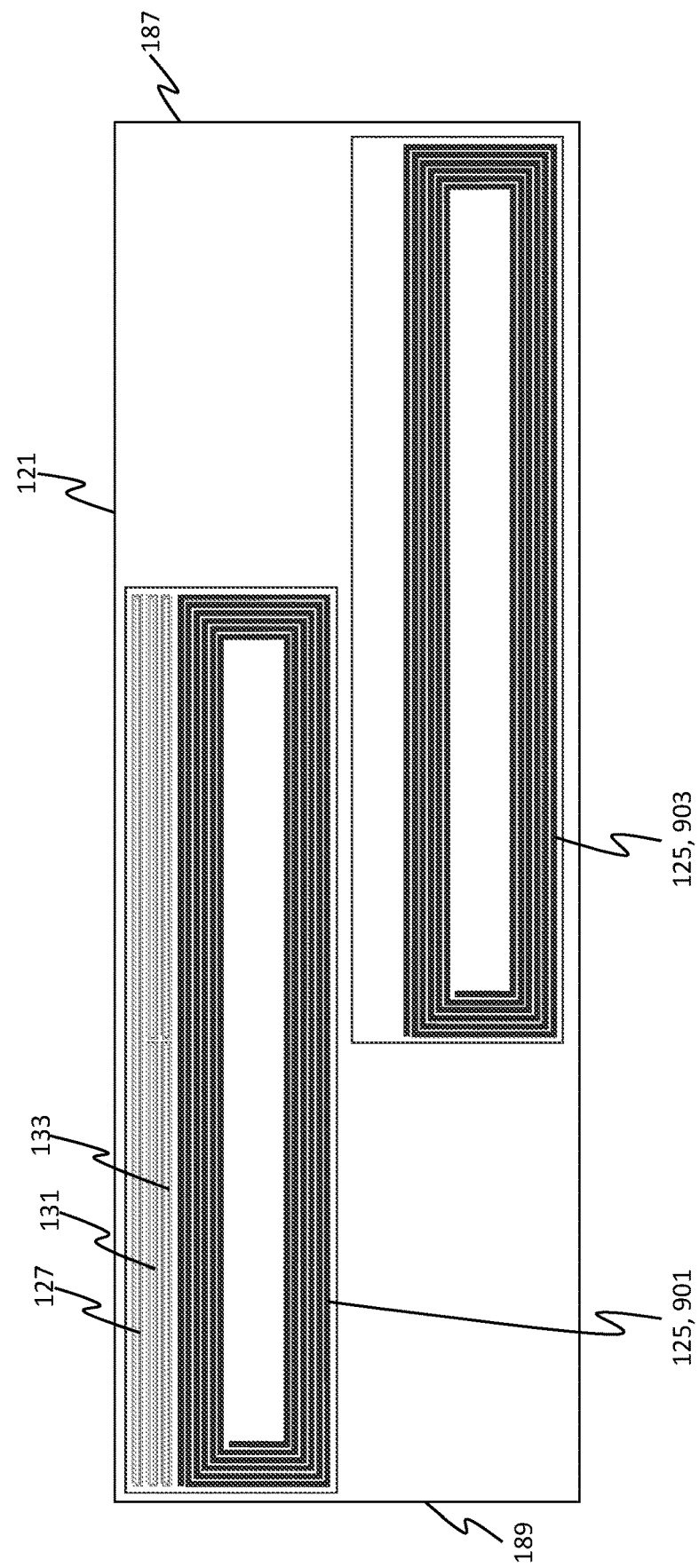
FIG. 10 shows a stationary coil module in a further embodiment in a side view.

FIG. 10 shows a stationary coil module 121 in a different embodiment. The coil module 121 comprises two power-transmitting coils 125, which are provided with the reference numerals 901 and 903 for better differentiation.

The two power-transmitting coils 901 and 903 are arranged partially overlapping and at an offset with regard to each other. The power-transmitting coil 901 is arranged above the power-transmitting coil 903. The two power-transmitting coils 901 and 903 do not extend over a length of the coil module 121, i.e. from the left end 189 to the right end 187. A respective length of the power-transmitting coils 901 and 903 is, for example, a maximum of 75% of the length of the coil module 121.

This e.g. provides the technical advantage that an efficient power transmission is possible. In particular, this has the technical advantage that power ripples which may occur when the carriage 103 moves along the coil module 121 may be efficiently minimized. In particular, this enables a relatively consistent power transmission without significant power fluctuations.

Figure 11:
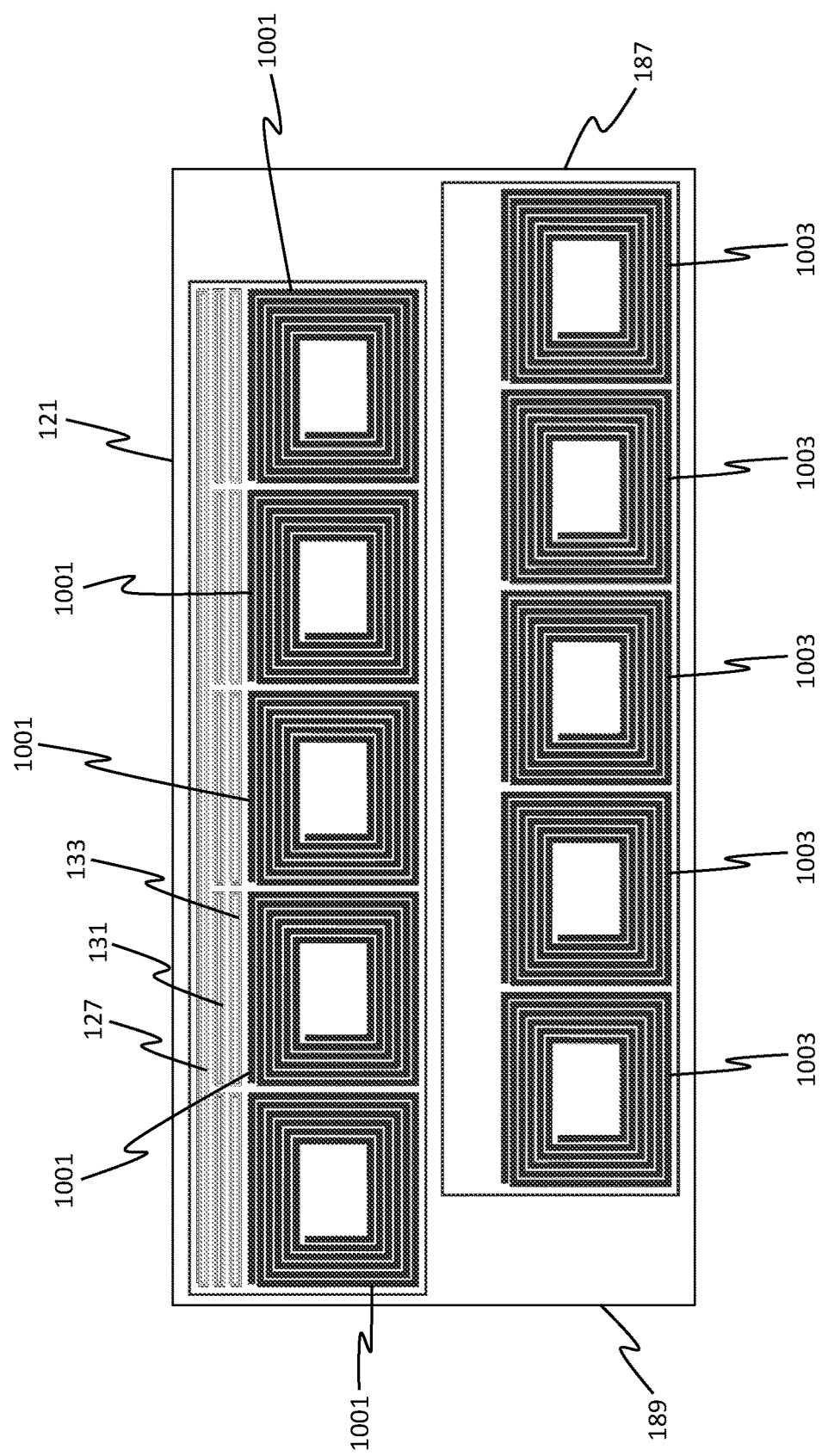
FIG. 11 depicts a stationary coil module in another embodiment in a side view.

FIG. 11 shows a stationary coil module 121 in an embodiment. The coil module 121 shown in FIG. 11 is partly identical to the coil module 121 shown in FIG. 10. Reference is made to the above embodiments.

As a difference, instead of the one upper power-transmitting coil 901, a plurality of power-transmitting coils 1001 are provided and instead of the one lower power-transmitting coil 903, a plurality of power-transmitting coils 1003 are provided which are arranged at an offset and partially overlapping in analogy to the power-transmitting coils 901 and 903 of FIG. 10.

A width of a power-transmitting coil 1001 or, respectively, 1003 of the coil module 121 of FIG. 11 e.g. thus corresponds to a length of a carriage at most, so that no more than one carriage may be above a power-transmitting coil in its length.

An advantage of this embodiment is that at most a full-length carriage may be placed on a power-transmitting coil a maximum of times. The carriage tunes the natural frequency of a power-transmitting resonant circuit comprising the power-transmitting coil and the power-receiving coil. Since, however, a plurality of power-transmitting coils are provided per coil module, power-transmitting coils remain which are not or only slightly influenced by the carriage.

An advantage of an embodiment in which a power-transmitting coil does not extend over two stationary coil modules is, for example, that an electrical contact between the coil modules for the purpose of electrical contact between the two parts of the power-transmitting coil may be dispensed with, which may then, however, result in a drop in power due to a gap between two directly adjacent power-transmitting coils of two coil modules.

Figure 12:
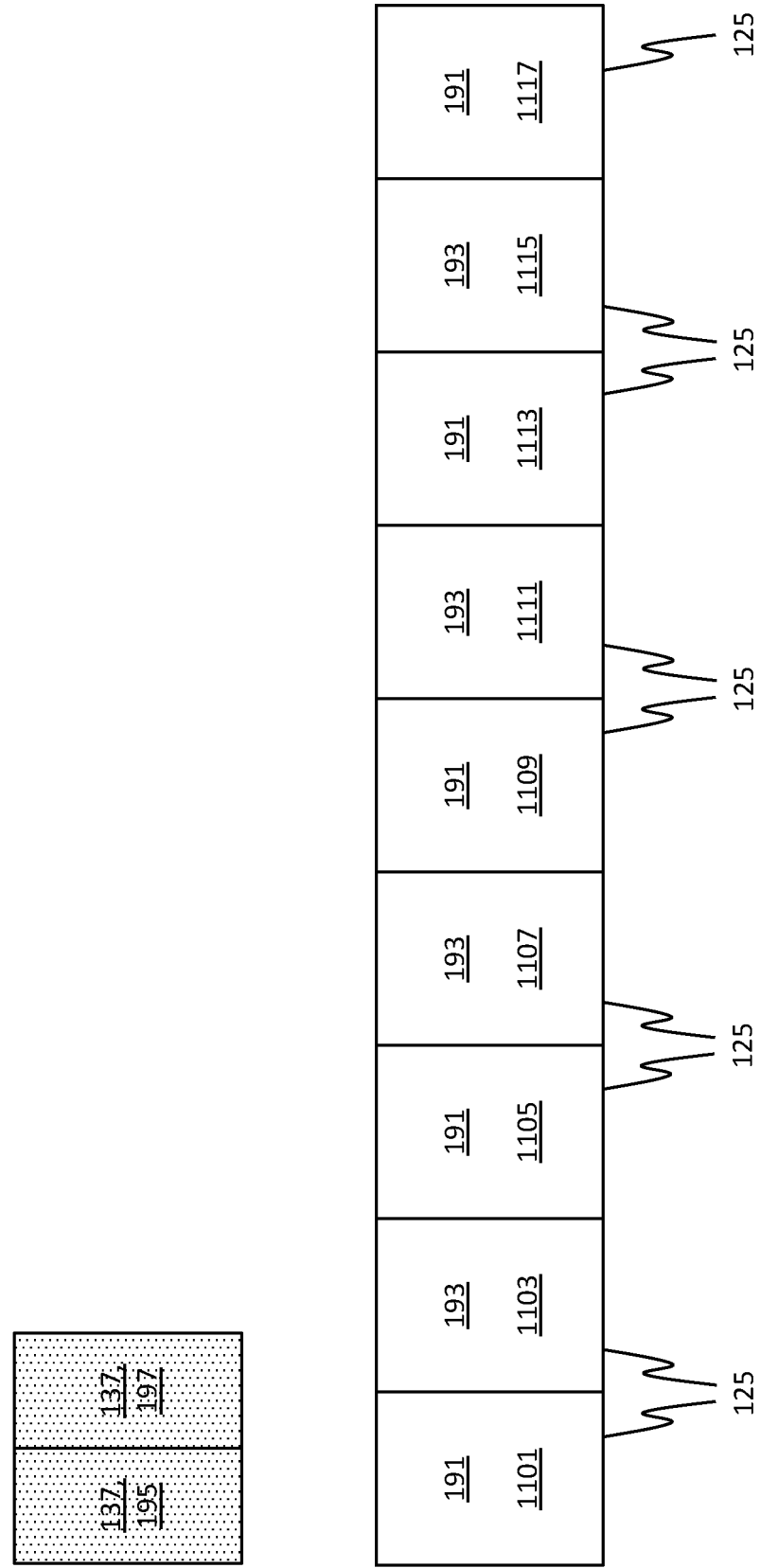
FIG. 12 depicts a plurality of power-receiving coils arranged side by side and two power-receiving coils in a side view.

FIG. 12 shows a plurality of power-transmitting coils 125 arranged side by side, which are referred to as follows: A first power-transmitting coil 1101, a second power-transmitting coil 1103, a third power-transmitting coil 1105, a fourth power-transmitting coil 1107, a fifth power-transmitting coil 1109, a sixth power-transmitting coil 1111, a seventh power-transmitting coil 1113, an eighth power-transmitting coil 1115, and a ninth power-transmitting coil 1117.

The power-transmitting coils 125 e.g. each comprise a width that is two-thirds of a sum of the widths of all power-receiving coils of the carriage 103. The coils 125 are energized in opposite directions, i.e. in opposite directions or 180° out of phase. For better differentiation, those coils 125 which are energized according to a first phase are additionally marked with the reference numeral 191, and those coils 125 which are energized according to a second phase shifted by 180° from the first phase are additionally marked with reference numeral 193.

The first, third, fifth, seventh and ninth power-transmitting coils are thus energized according to the first direction. The second, fourth, sixth and eighth power-transmitting coils are accordingly energized 180° out of phase relative to the first direction.

In an embodiment, more or less power-transmitting coils are provided than the number of power-transmitting coils shown in FIG. 12. The embodiments shown in FIG. 12 apply analogously.

FIG. 12 also shows two power-receiving coils 137, which are referred to as follows: A first power-receiving coil 195 and a second power-receiving coil 197. The two power-receiving coils 195 and 197 are located on a carriage, e.g. on carriage 103 of the linear transport system 101 shown in FIG. 1.

According to an embodiment, the two power-receiving coils 195, 197 each have a width that corresponds to half the width of carriage 103. This means that according to this embodiment, the sum of the widths of the two power-receiving coils 195, 197 corresponds to the width of the carriage 103.

Figure 13:
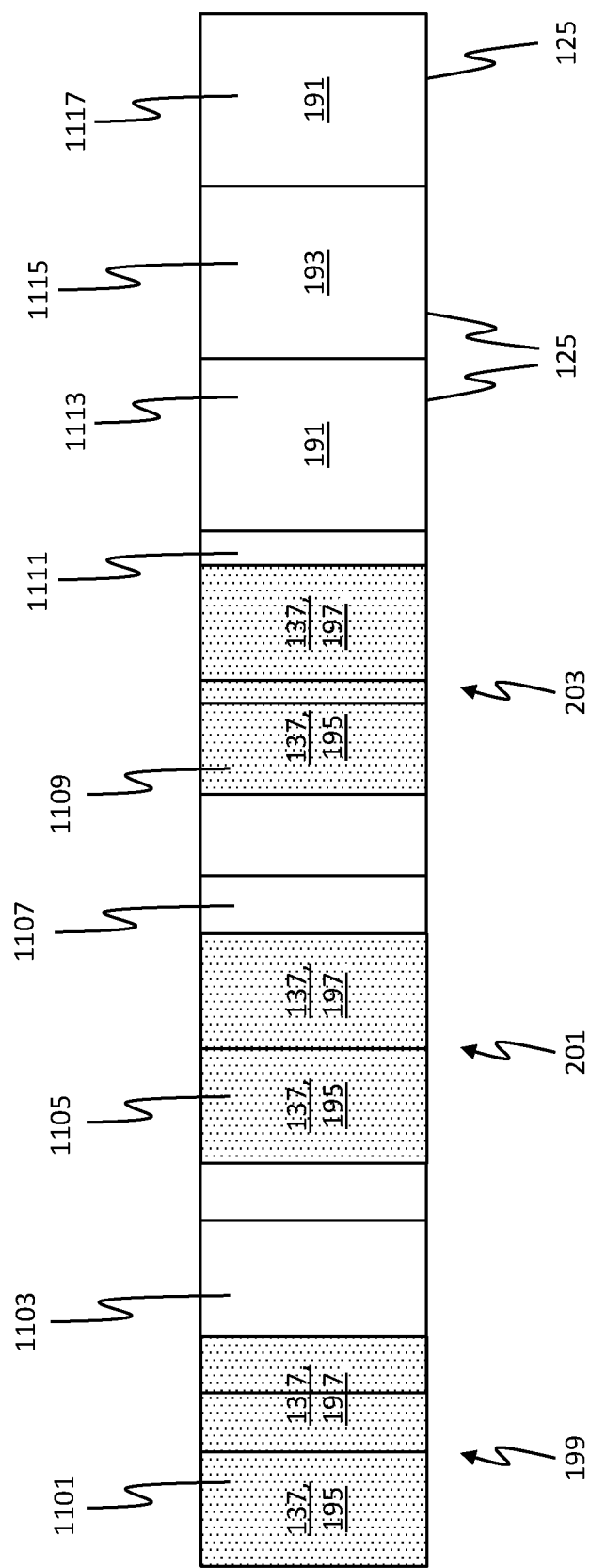
FIG. 13 shows three different positions of two power-receiving coils during a movement of a carriage along the power-transmitting coils shown in FIG. 12 in a side view.

FIG. 13 shows three different positions of the two power-receiving coils 195, 197 during a movement of the carriage along the power-transmitting coils 125. In a first position 199, the first power-receiving coil 195 is completely above the first power-transmitting coil and is therefore 100% coupled to the first power-receiving coil 1101.

This and the following percentages each refer to a percentage overlap of the corresponding power-receiving coil with the corresponding power-transmitting coil, taking into account the opposite current flow. The second power-receiving coil 197 is located in the first position 199 half above the first power-transmitting coil 195 and half above the second power-transmitting coil 1103. Since the first and second power-transmitting coils 1101, 1103 are energized in opposite directions, the respective inductive couplings cancel each other out, so that the second power-receiving coil in the first position 199 is coupled to the first power-transmitting coil 1101 by 0% and to the second power-transmitting coil 1103 by 0%.

In a second position 201, the first power-receiving coil 195 is completely above the third power-transmitting coil 1105 and is thus 100% coupled to the third power-transmitting coil 1105 by 100%. The second power-receiving coil 197 is located completely above the fourth power-transmitting coil 1107 and is therefore coupled to the fourth power-transmitting coil 1105 by 100%.

In a third position 203, the first power-receiving coil 195 is partly above the fifth power-transmitting coil 1109 and partly above the sixth power-transmitting coil 1111. Since the fifth power-transmitting coil 1109 and the sixth power-transmitting coil 1111 are supplied with current in opposite directions, the respective inductive couplings partly cancel each other out, so that in total the first power-receiving coil 195 is coupled to the fifth power-transmitting coil 1109 by 60%.

In the third position 203, the second power-receiving coil 197 is located completely above the sixth power-transmitting coil 1111 and is therefore 100% coupled to the sixth power-transmitting coil 1111.

Figure 14:
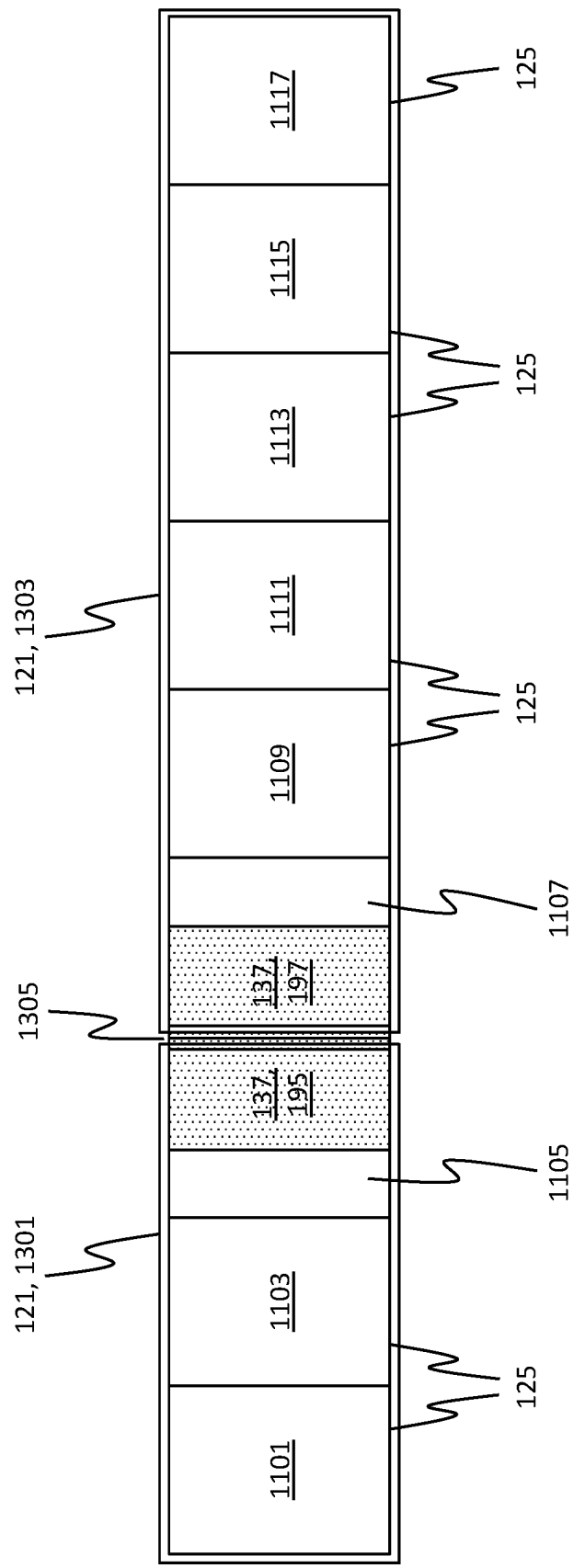
FIG. 14 depicts two stationary coil modules 121 in a further embodiment in a side view.

FIG. 14 shows two stationary coil modules 121 in a further embodiment. The left coil module 121 shown in FIG. 14 is additionally provided with reference numeral 1301 and the right coil module 121 shown in FIG. 14 is additionally provided with reference numeral 1303.

The left coil module 1301 includes the first, second, and third energy transmitting bobbins 1101, 1103, 1105 of FIG. 12. The right-hand coil module 1303 includes the fourth, fifth, sixth, seventh, eighth, and ninth power-transmitting coils 1107, 1109, 1111, 1113, 1115, and 1117 of FIG. 12.

In an embodiment, both coil modules 1301 and 1303 include an equal number of power-transmitting coils. As already described in connection with FIGS. 12 and 13, the individual power-transmitting coils are energized in opposite directions.

FIG. 14 further shows the two power-receiving coils 195, 197. The second power-receiving coil 197 is located completely above the fourth power-transmitting coil 1107 of the right coil module and is therefore 100% inductively coupled to the fourth power-transmitting coil 1107.

The first power-receiving coil 195 is partially located above the third power-transmitting coil 1105 and partially above a gap 1305 between the left coil module 1301 and the right coil module 1303. In this respect, an inductive coupling of the first power-receiving coil 195 to the third power-transmitting coil 1105 is lower compared to a position in which the first power-receiving coil 195 is completely above the third power-transmitting coil 1105.

The embodiment shown in FIG. 14 makes it possible to efficiently and uniformly supply the carriage with power even during a transition of a carriage between the left and the right stationary coil modules 1301, 1303.

Providing two adjacent power-receiving coils on the carriage has the advantage that when e.g. the carriage passes from one coil module to the next, it is ensured that one of the two power-receiving coils is always positioned over the entire surface of one of the coil modules, thus always guaranteeing a minimum of transmission power.

This also has the advantage that the excitation of the power-transmitting coils does not have to be synchronized. This means that no direct connection between the coil modules is required, as is necessary, for example, with an embodiment according to which a power-transmitting coil extends over two coil modules (two parts of a power-transmitting coil that form a joint power-transmitting coil).

Thus the problem of the power ripple in the coil and module transition due to the gap may be efficiently solved.

Figure 15:
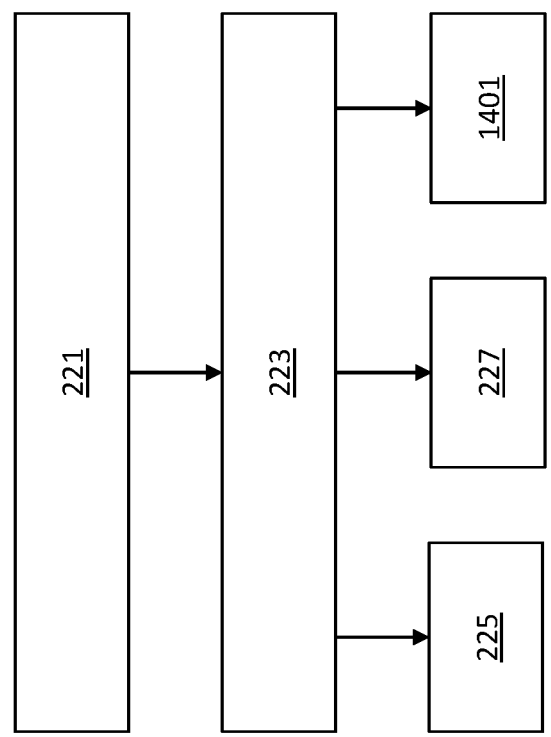
FIG. 15 shows a flow chart of a method for operating a linear transport system.

FIG. 15 shows a flow chart of a method for operating a linear transport system, comprising the following steps: controlling 221 the voltage supply by the control device so that at least one of said one or said plurality of power-transmitting coils and/or at least one of said one or said plurality of first data coils is supplied with an electrical voltage, so that via an inductive coupling of a power-transmitting coil, to which an electrical voltage is applied with a power-receiving coil, power is transmitted contactlessly to the carriage 225 and/or via an inductive coupling of a first data coil, to which an electrical voltage is applied, with a second data coil, data is transmitted contactlessly to the carriage 227 and/or received from the carriage 1401.

The concept according to the invention allows for a uniform energy transmission without strong power fluctuations. In order to avoid beating in different oscillating circuits (formed by the coils), the power-transmitting coils and/or the first coils and/or the second coils are e.g. actively excited with a frequency that corresponds to the resonance frequency. A bidirectional, synchronous communication is achieved for example by magnetic or electromagnetic pulses (signals, waves). The synchronous data transmission makes it possible in an advantageous way that a "distributed clock" (phase control loop) may run in the receiver (carriage). This makes it possible, for example, to execute exactly synchronized motion sequences by a gripper on the carriage. This makes it possible, in particular, to transmit a movement command for a certain movement of the gripper to the carriage independently from a communication cycle.

In an embodiment, the carriage-coil module comprises one or a plurality of power storages for storing transmitted power. Such a power storage is e.g. an electrolytic capacitor.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

The invention claimed is:

1. A linear transport system comprising:
   a movable carriage,
   a guide rail for guiding the carriage, and
   a linear motor for driving the carriage along the guide rail, the linear motor comprising a stator and a rotor, the stator comprising at least one motor module arranged along the guide rail in a stationary manner, each motor module comprising one or a plurality of drive coils, the rotor being arranged at the carriage and comprising one or a plurality of magnets; and
   a system for contactless power and data transmission, the system for contactless power and data transmission comprising:
   one or a plurality of stationary coil modules arranged along the at least one motor module in a stationary manner, and
   one or a plurality of carriage-coil modules arranged at the carriage,
   wherein said one or said plurality of stationary coil modules each comprises one or a plurality of power-transmitting coils and one or a plurality of first data coils, and
   wherein said one or said plurality of carriage-coil modules comprises one or a plurality of power-receiving coils which may be inductively coupled to said one or said plurality of power-transmitting coils and one or a plurality of second data coils which may be inductively coupled to said one or said plurality of first data coils; and
   a control device configured to control a power supply for said one or said plurality of stationary coil modules to apply an electrical voltage to at least one of said one or said plurality of power-transmitting coils and/or to at least one of said one or said plurality of first data coils, respectively,
   so that power may be contactlessly transmitted to the carriage via an inductive coupling of a power-transmitting coil, to which an electrical voltage has been applied, to a power-receiving coil and/or data may be contactlessly transmitted to the carriage and/or received from the carriage via an inductive coupling of a first data coil, to which an electrical voltage has been applied, with a second data coil;
   wherein the first data coil and the second data coil form a first, a second and a third communication channel in order to transmit data to the carriage via the first communication channel, in order to receive data from the carriage via the second communication channel and in order to transmit a clock signal based on a reference time to the carriage via the third communication channel.

2. The linear transport system according to claim 1, wherein the system for contactless power and data transmission comprises a communication interface configured to receive the reference time via a communication network, wherein the control device is adapted to control the power supply based on the reference time in order to contactlessly transmit the clock signal based on the reference time as data to the carriage.

3. The linear transport system according to claim 1, wherein the carriage has a carriage-power supply coupled to said one or said plurality of power-receiving coils for supplying the transmitted power to the carriage-power supply, wherein the carriage comprises a carriage-control device coupled to the carriage-power supply for supplying electrical power from the carriage-power supply.

4. The linear transport system of claim 3, wherein the carriage-power supply is coupled to at least one of one or a plurality of second data coils, wherein the carriage-control device is adapted to control the carriage-power supply to supply electrical voltage to at least one of the at least one second data coils coupled to the carriage-power supply, so that data may be contactlessly transmitted from the carriage via an inductive coupling of a second data coil, to which an electrical voltage has been applied, with a first data coil.

5. The linear transport system according to claim 3, wherein the carriage comprises an electrical device coupled to the carriage-power supply in order to be adapted to provide electrical power to the electrical device, wherein the carriage-control device is coupled to said one or said plurality of second data coils to receive the transmitted data, and wherein the carriage-control device is configured to control the electrical device based on the received data.

6. The linear transport system according to claim 1, wherein at least one of said one or a plurality of stationary coil modules extends along said at least one motor module, wherein said at least one stationary coil module comprises exactly one power-transmitting coil extending along said at least one motor module from a first end to a second end of said at least one coil module opposite said first end.

7. The linear transport system according to claim 1, wherein at least one of said one or said plurality of stationary coil modules extends along the at least one motor module, wherein the at least one stationary coil module comprises a plurality of power-transmitting coils arranged along the at least one motor module at an offset with regard to each other.

8. The linear transport system according to claim 7, wherein the plurality of power-transmitting coils are arranged partially overlapping and at an offset with regard to each other.

9. The linear transport system according to claim 1, wherein a plurality of stationary coil modules extending along the at least one motor module are provided, at least two of which are arranged immediately adjacent to one another, wherein the two immediately adjacent stationary coil inductors each comprise a part of a power-transmitting coil in such a way that the two parts form a power-transmitting coil.

10. The linear transport system according to claim 1, wherein at least one of said one or said plurality of stationary coil modules is arranged on an outer side of the at least one motor module.

11. The linear transport system according to claim 1, wherein at least one of said one or said plurality of stationary coil modules is arranged within an assembly space of the at least one motor module.

12. The linear transport system according to claim 1, wherein at least one of said one or said plurality of stationary coil modules has a circuit board comprising said one or said plurality of power-transmitting coils and said one or said plurality of first data coils, said circuit board forming an outer side of said at least one motor module.

13. A method of operating a linear transport system according to claim 1, the method comprising the following steps:
  controlling the power supply by the control device so that at least one of said one or said plurality of power-transmitting coils and/or at least one of said one or said plurality of first data coils are each supplied with an electrical voltage,
  so that power is transmitted without contact to the carriage via an inductive coupling from a power-transmitting coil, to which an electrical voltage has been applied, to a power-receiving coil, and/or via an inductive coupling of a first data coil, to which an electrical voltage has been applied, with a second data coil, data is contactlessly transmitted to the carriage and/or received from the carriage.

14. A contactless power and data transmission system comprising:
  one or a plurality of stationary coil modules arranged along at least a motor module in a stationary manner, and
  one or a plurality of carriage-coil modules arranged at a carriage,
  wherein said one or said plurality of stationary coil modules each comprises one or a plurality of power-transmitting coils and one or a plurality of first data coils, and
  wherein said one or said plurality of carriage-coil modules comprises one or a plurality of power-receiving coils which may be inductively coupled to said one or said plurality of power-transmitting coils and one or a plurality of second data coils which may be inductively coupled to said one or said plurality of first data coils;
  a control device configured to control a power supply for said one or said plurality of stationary coil modules to apply an electrical voltage to at least one of said one or said plurality of power-transmitting coils and/or to at least one of said one or said plurality of first data coils, respectively,
  so that power may be contactlessly transmitted to the carriage via an inductive coupling of a power-transmitting coil, to which an electrical voltage has been applied, to a power-receiving coil and/or data may be contactlessly transmitted to the carriage and/or received from the carriage via an inductive coupling of a first data coil, to which an electrical voltage has been applied, with a second data coil; and
  a communication interface configured to receive a reference time via a communication network, wherein the control device is adapted to control the power supply based on the reference time in order to contactlessly transmit a clock signal based on the reference time as data to the carriage;
  wherein the first data coil and the second data coil form a first, a second and a third communication channel in order to transmit the data to the carriage via the first communication channel, in order to receive data from the carriage via the second communication channel and in order to transmit the clock signal based on the reference time to the carriage via the third communication channel.

15. The system according to claim 14, wherein the carriage has a carriage-power supply coupled to said one or said plurality of power-receiving coils for supplying the transmitted power to the carriage-power supply, wherein the carriage comprises a carriage-control device coupled to the carriage-power supply for supplying electrical power from the carriage-power supply.

16. The system according to claim 14, wherein at least one of said one or a plurality of stationary coil modules extends along said at least one motor module, wherein said at least one stationary coil module comprises exactly one power-transmitting coil extending along said at least one motor module from a first end to a second end of said at least one coil module opposite said first end.

17. The system according to claim 14, wherein at least one of said one or said plurality of stationary coil modules extends along the at least one motor module, wherein the at least one stationary coil module comprises a plurality of power-transmitting coils arranged along the at least one motor module at an offset with regard to each other.

18. The system according to claim 14, wherein a plurality of stationary coil modules extending along the at least one motor module are provided, at least two of which are arranged immediately adjacent to one another, wherein the two immediately adjacent stationary coil inductors each comprise a part of a power-transmitting coil in such a way that the two parts form a power-transmitting coil.

19. The system according to claim 14, wherein at least one of said one or said plurality of stationary coil modules has a circuit board comprising said one or said plurality of power-transmitting coils and said one or said plurality of first data coils, said circuit board forming an outer side of said at least one motor module.

20. The system according to claim 14, wherein the control device is adapted to control the power supply for said one or said plurality of stationary coil modules to apply the electrical voltage to at least one of said one or said plurality of first data coils based on the reference time in order to contactlessly transmit the clock signal based on the reference time as data to the carriage, via an inductive coupling of the first data coil, to which the electrical voltage has been applied, with the second data coil.

* * * * *